United States Patent
Corson et al.

[15] 3,643,932
[45] Feb. 22, 1972

[54] METHOD AND APPARATUS FOR CALCINING PARTICULATE MINERAL MATERIALS

[72] Inventors: Bolton L. Corson, Philadelphia; Budd R. Royer, Lansdale, both of Pa.

[73] Assignee: G. & W. H. Corson, Inc., Plymouth Meeting, Pa.

[22] Filed: Apr. 3, 1970

[21] Appl. No.: 25,392

[52] U.S. Cl. ............................................263/21 C, 431/178
[51] Int. Cl. ....................................F27b 3/06, F27b 15/00
[58] Field of Search ..............263/21 R, 21 A, 21 C; 34/57 A; 431/178, 179, 190

[56] References Cited

UNITED STATES PATENTS 3,417,978   12/1968   Suzukawa et al. .....................263/21 A Primary Examiner—John J. Camby
Attorney—Howson and Howson

[57] ABSTRACT

A method and apparatus for the improved calcining of particulate mineral materials adapted particularly for the vibratory type kiln wherein a bed of particulate material is intermittently vibrated or reciprocated during the burning of a gaseous fuel therein. In the present invention, gaseous fuel and preheated air are separately introduced into the particulate material bed at a plurality of regularly spaced locations. This permits a uniform penetration of the air and fuel into the interstices of the particulate material and a consequent uniform burning of the fuel throughout the material bed. As a result, a deeper bed may be maintained, and a more uniform product is obtained at a faster rate and with lower fuel consumption.

11 Claims, 8 Drawing Figures

PATENTED FEB 22 1972 3,643,932
SHEET 1 OF 2
FIG. 1.
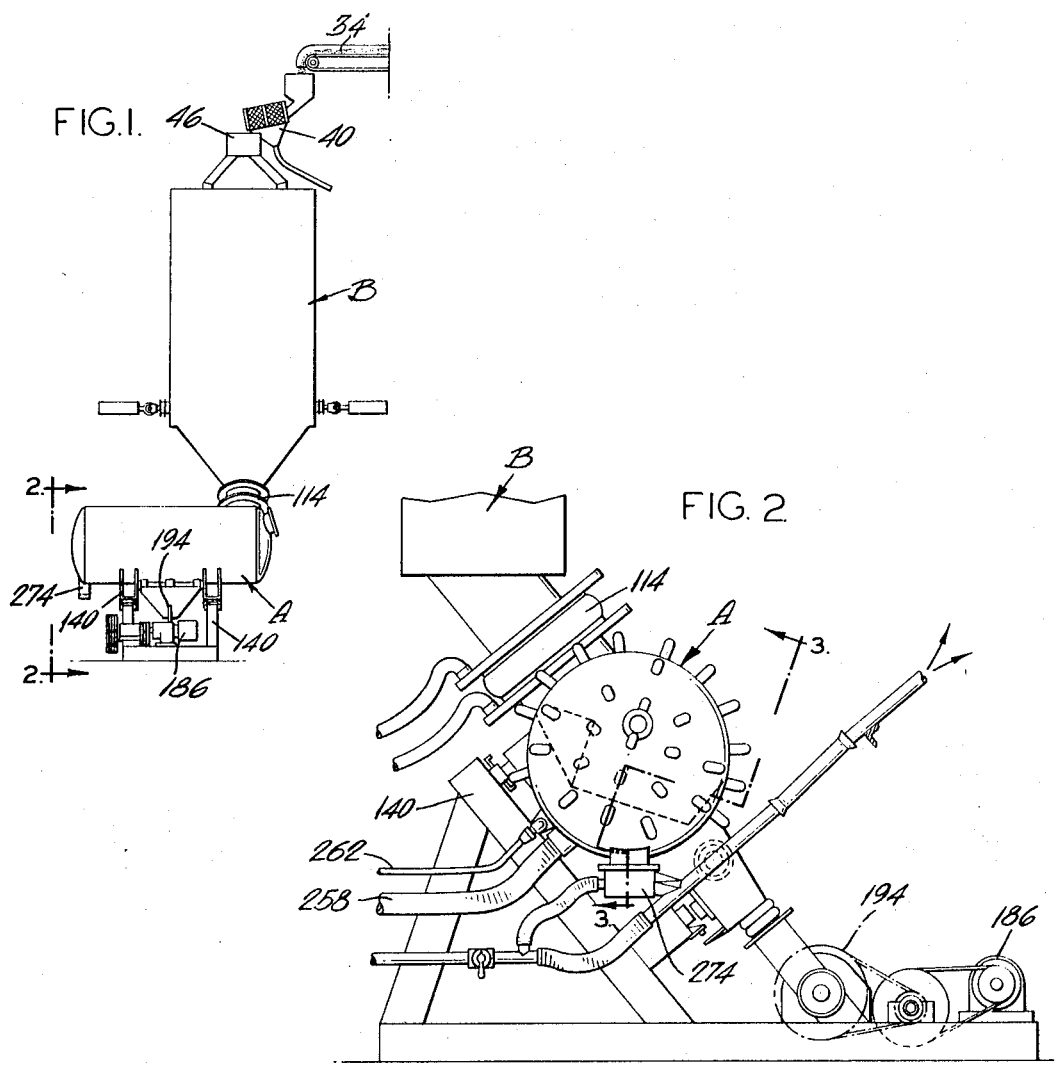
FIG. 2.
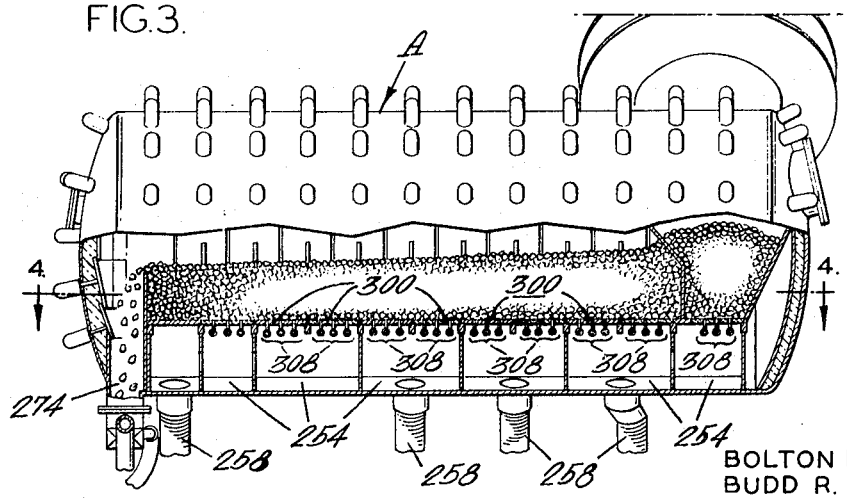
FIG. 3.
INVENTORS:
BOLTON L. CORSON
BUDD R. ROYER
BY Howson & Howson
ATTYS.

INVENTORS:
BOLTON L. CORSON
BUDD R. ROYER
BY Howson & Howson
ATTYS.

METHOD AND APPARATUS FOR CALCINING PARTICULATE MINERAL MATERIALS

The present invention relates generally to the calcining of particulate mineral material and relates more particularly to a method and apparatus for improving the calcining of intermittently agitated beds of particulate material by providing a more uniform burning of a gaseous fuel within the material bed.

Although the present invention is broadly applicable to the calcining of mineral materials, it is anticipated that its primary application will be in the calcining of limestone, a necessary operation in the production of quicklime. In the present application, the invention will accordingly be presented in the environment of limestone calcining operations although it will be apparent that the method and apparatus employed can equally well be applied to the treatment of other materials.

In the calcining of high-calcium limestone, which is essentially calcium carbonate, the stone is heated to the temperature of disassociation of the carbonate whereupon it is broken down into quicklime and carbon dioxide. The stone particles must be maintained at the calcining temperature above approximately 1,700° F. for a sufficient time to permit the disassociation process to penetrate to the interior of the particles.

The calcining operation is extremely critical since if the calcining temperature or retention time in the kiln is insufficient, the stone particles will retain a center core of uncalcined carbonate stone, an undesirable product which is known as underburned lime. If the calcining temperature is too high or the retention time too long, the stone tends to shrink and densify, decreasing the reactivity of the lime. This undesirable product is known as hard-burned lime. The production of a thoroughly calcined soft-burned lime can only be obtained by a careful control of the calcining operations including the stone temperature, retention time in the kiln, manner in which the particles move through the kiln, uniformity of particle size, etc.

The kilns presently in commercial use for calcining lime are of several types. Principally, these include rotary kilns, wherein the material is continuously tumbled as it passes down an inclined rotating cylinder, and vertical or shaft kilns wherein the material drops vertically through a kiln shaft through various treating zones. The characteristic advantages and disadvantages of the several types of limestone kilns are well known. In a rotary kiln, the gaseous fuel is not burned within the material bed but is burned in the cylindrical furnace over the bed, and the heating effect obtained is primarily by radiation as the limestone particles are tumbled. In the vertical kiln, the fuel burning may take place within the bed of material but tends to stratify with a resultant uneven calcining of the stone.

The present invention pertains to a more recent type of kiln known as a vibratory kiln wherein a gaseous fuel is burned within a bed of material which is intermittently agitated to insure a relatively uniform burning of the stone and to move the stone through the calcining region. A preferred type of kiln for practicing the invention is disclosed in U.S. Pat. No. 3,250,520, issued on May 10, 1966. The invention may also be applied to a kiln of the type shown in U.S. Pat. No. 3,022,988, issued on Feb. 27, 1962. Each of these patents is assigned along with the present application to a common assignee. In this type of kiln, the particulate material passes in a bed of substantial depth through a calcining zone wherein the material is intermittently agitated or vibrated to provide by reason of the shape and inclination of the bed support a movement of the material through the calcining zone as well as an intermixing of the material particles. A gaseous fuel is introduced upwardly through the material bed supporting surface and is burned within the bed to calcine the particles. In a typical example of operation of this type of kiln, the material is subjected to periods of vibration or agitation followed by periods of rest. The length of these periods depends on the size and character of the stone as well as the degree of temperature of the combustion air, length of the kiln, etc. However, in a typical design the rest period is usually about one minute and the agitation period 10 seconds.

Although vibratory kilns have been successfully operated on a commercial scale for a number of years, it has now been found that the quality of the product, the volume output, and the thermal efficiency of the kiln can be markedly improved by the relatively simple method and apparatus of the present invention. As indicated above, the present improvement relates to the burning of the gaseous fuel in the material bed. In the prior vibratory kilns, the gaseous fuel and the combustion supporting air were introduced to the bed of particulate material through concentric inlet ports in the material support surface. An arrangement of this type is shown in detail in U.S. Pat. No. 3,250,520 in FIG. 13. With the fuel and air introduced at the same points, a very hot torchlike flame resulted at each combined air and fuel inlet, which flame tended to drive in a torchlike manner up through the bed of material, sometimes emerging above the bed with a consequent loss of heat to the stack. The stone particles in the path of and adjacent to the flame would receive considerably more heat than particles more remote therefrom, and an uneven calcining of the stone resulted.

Furthermore, with the prior structures, the stone particles would frequently lodge directly above the fuel and air inlet ports which prevented the fuel and air from passing up into the material bed. At times, the fuel turned downwardly and heated the hollow burner plates, such as shown in U.S. Pat. No. 3,250,520 to such a degree that the gas cracked and formed carbon which blocked the gas outlet ports. This phenomenon can occur at approximately 1,100°–1,300° F. with most natural gases. The tendency for port blockage to occur increased with the increase in the depth of the material bed and, therefore, it was mandatory that the limestone bed be maintained at a comparatively shallow depth in the calciner. A shallow material bed, however, increased the tendency for the gases to pass through the bed and exit at high temperatures to the preheater which in turn increased the difficulties of maintaining the tables, hoods, and feeding mechanisms in the preheater. The penetration of the gas through the bed is readily understood in view of the fact that the gas is introduced at pressures as high as 20 pounds while the air is seldom supplied at over 1 pound.

In the present invention, the gas inlet ports in the bedplates supporting the material are spaced from the air inlet ports thereby independently introducing gaseous fuel and preheated combustion supporting air into the material bed. With this arrangement, the fuel and air penetrate the interstices of the entire particulate bed and burn in a uniform manner throughout the bed. There are no hot spots directly above the fuel inlets since these regions are the farthest spaced from the air inlets and burn with a rich controlled flame. There is no possibility of the gas burning within the air inlet region should material particles become lodged directly over the gas inlet ports. If a piece of material blocks a gas or air port, the flow of gas or air through that port is simply stopped until the port is cleared during the next shaking operation.

It has been found that by using the present separated gas and air inlet arrangement, a substantially deeper bed of material may be maintained in the kiln and this increase in depth permits an increase in the volume and pressure of the gas supplied to the bed. A much more uniform temperature condition is produced throughout the bed, and the depth of the bed eliminates the tendency for the gases to pass through and burn above the bed. As a result of the permissible increase in bed depth, the output of the kilns has in all cases been greatly increased and in some cases by as much as 50 percent. At the same time, the fuel consumption per ton is substantially lower since the burning of the fuel above the bed is minimized. In a typical installation, the fuel consumption per ton was lowered by the present invention from 6.5 to 5.5 million BTUs per ton. The more uniform burning of the fuel with the present invention naturally produces a more uniform calcining of the stone particles. The occurrence of underburned or hard-burned particles is substantially eliminated and production consequently increased.

It is accordingly a first object of the present invention to provide an improved method and apparatus for the calcining of particulate mineral materials characterized by the burning of a gaseous fuel within a vibrated material bed.

A further object of the invention is to provide a method and apparatus as described which permits the calcining of a relatively deep bed of material thus increasing the output of a conventional vibratory kiln by as much as 50 percent.

Another object of the invention is to provide a method and apparatus as described which by providing a more uniform burning of the material substantially eliminates the occurrence of underburned or hard-burned particles.

A still further object of the invention is to provide a method and apparatus as described which substantially reduces the fuel consumed per ton of material processed.

A still further object of the invention is to provide a method and apparatus as described which provides a more controlled calcining operation and hence an improved quality product.

Another object of the invention is to provide a method and apparatus as described which may be readily applied to existing vibratory kilns.

Additional objects and advantages of the invention will be more readily apparent from the following detailed description of embodiments thereof when taken together with the accompanying drawings in which:

FIG. 1 is a front elevational view of a conventional vibratory kiln which has been modified to incorporate the improvement of the present invention;

FIG. 2 is an enlarged end elevational view of the kiln taken along line 2—2 of FIG. 1;

FIG. 3 is an enlarged view partly in section taken along line 3—3 of FIG. 2 and showing the bed of particulate material as it moves through the calcining zone during vibration of the kiln;

Figure 4:
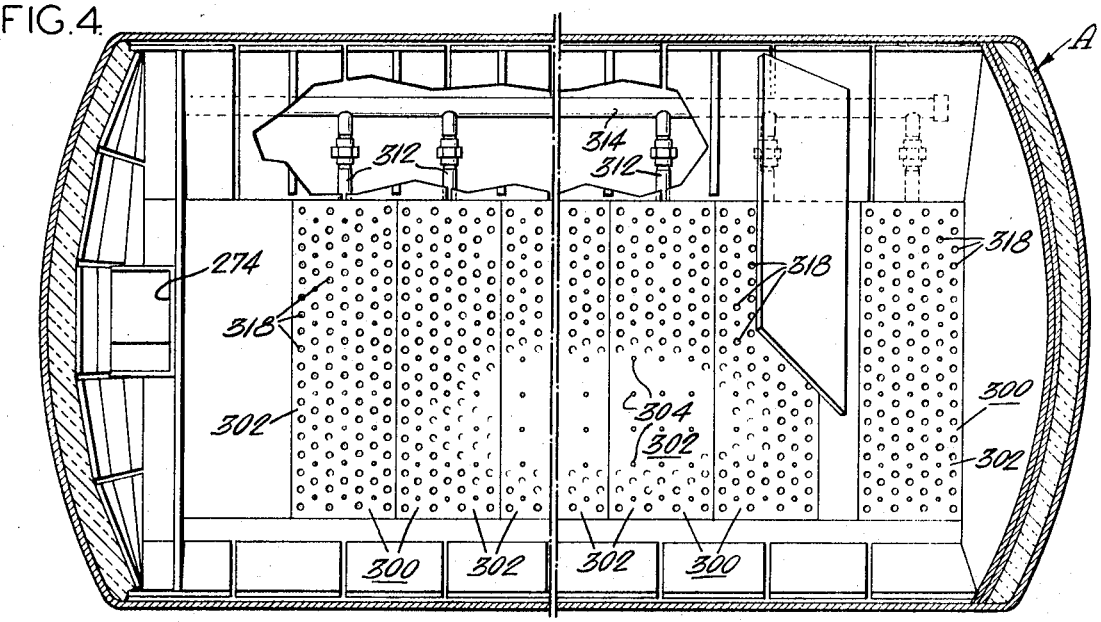
FIG. 4 is a sectional view taken along line 4—4 of FIG. 3 showing a plan layout of the present burner pad assemblies and the fuel manifold connections.

Referring to the drawings and particularly to FIGS. 1 and 2 thereof, a vibratory kiln is illustrated which is of the identical type shown and described in the above-mentioned U.S. Pat. No. 3,250,520, issued May 10, 1966, the disclosure of which is hereby incorporated by reference. Since the structure and operation of this kiln are completely described in that patent, only a summary is presented herebelow. The identifying numerals and indicia utilized in the patent will for convenience be similarly applied in the present case.

The vibratory kiln includes a calcining section A and a preheating section B, the generally cylindrical calcining section being suitably mounted on supporting frames 140 for vibratory or reciprocatory motion in an inclined plane as intermittently provided by motor 186 driving the eccentric drive unit 194. The flexible connector 114 between the calcining section A and preheating section B maintains a sealed path through which the material to be calcined may drop under gravity force into the calcining section. A continuous conveyor apparatus 34 carries the particulate material, for example limestone, into the sizer 40 which separates the fines and discharges the material of a given predetermined minimum size into hopper 46 and thence the preheater B.

In kiln operation, the material passing from the preheater drops into one end of the calcining section and forms a bed of material into which a gaseous fuel and air are introduced from below. The continuing introduction of material and the intermittent vibrating or shaking of the calcining section cause the material to gradually move toward the opposite end of the calcining section where it passes through a discharge opening 274. The depth of the bed, temperature of the calcining section, the rate of introduction of the material, and frequency and duration of the periods of vibration are carefully controlled to provide the optimum calcining temperature conditions and retention time for the particular material processed.

Figure 5:
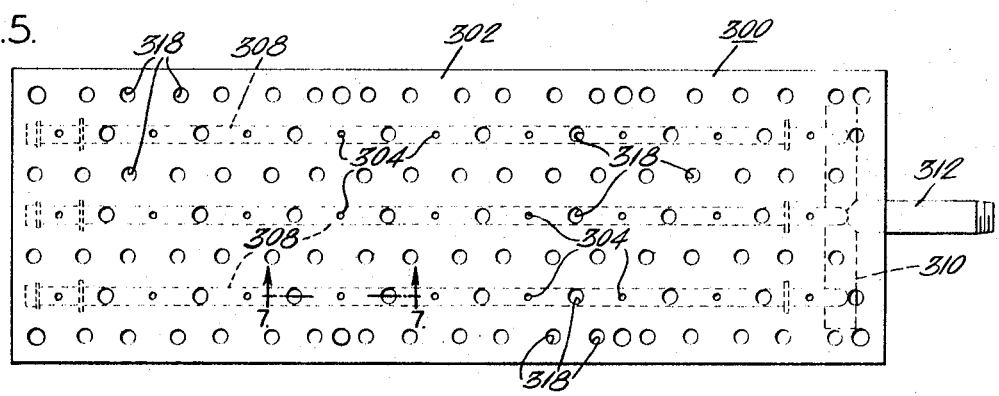
FIG. 5 is an enlarged plan view of one of the burner pad assemblies of the kiln of FIGS. 1–4.
Figure 6:
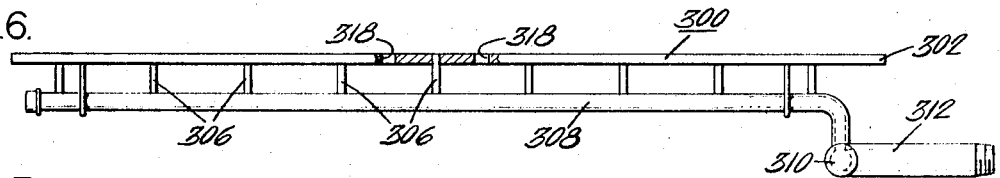
FIG. 6 is a side elevational view of the burner pad assembly of FIG. 5.
Figure 7:
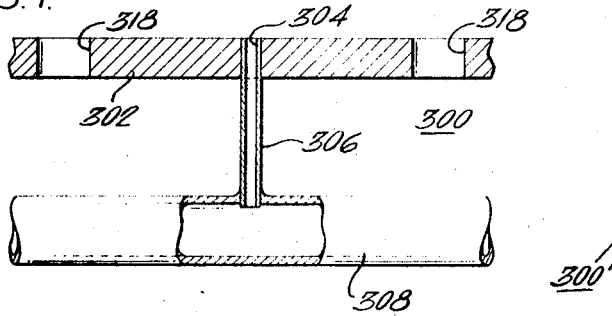
FIG. 7 is an enlarged partial sectional view taken along line 7—7 of FIG. 5 showing details of the air and gas inlet ports.

The improvement of the present invention involves the method and apparatus for introducing the gaseous fuel and preheated air into the material bed. As mentioned above, the bedplates 232 of the kiln of U.S. Pat. No. 3,250,520 are characterized by a plurality of concentric gas and air inlets as seen most readily in FIG. 13 of that patent. In the present invention, the plates 232 and associated burner plates 242 are replaced by the burner pad assemblies 300 which extend in parallel relation transversely across the calcining section to support the material bed. Each burner pad assembly 300 as shown in FIGS. 5–7 comprises a rectangularly shaped bedplate 302 having a plurality of gas inlet ports 304 therein. A gaseous fuel is delivered into the inlet ports 304 through vertical gas tubes 306 connected with the horizontal pipes 308 which in turn lead into the header 310 beneath one end of the plate. As shown in FIG. 4, the burner pads are supplied with a gaseous fuel under pressure by the connection of pipes 312 leading into the headers 310 with a main fuel manifold 314 by means of couplings 316. The manifold 314 is connected to fuel conduit 262 which leads to a suitable fuel source.

Spaced geometrically around the gas inlet ports 303 are air inlet ports 318 which comprise holes in the plate 302 of substantially larger diameter than the gas inlet ports and which communicate with the air chambers 254 therebeneath which are supplied with preheated combustion supporting air by the air conduits 258 as shown in FIG. 3.

For operation of the kiln with the described burner pad assemblies 300, a gaseous fuel is introduced into the material bed at a pressure dependent upon the depth of the bed but which might typically range between 5 and 20 p.s.i. The preheated (400°–600° F.) air is delivered to the air chambers 254 at a relatively low pressure, for example 30 inches of water. The introduction of the gaseous fuel and preheated air through the separate spaced ports in the bedplate permits a penetration of the interstices between the material particles by both the gas and air and a resultant uniform burning of the fuel-air mixture throughout the material. There are no hot spots above the fuel inlet ports which might tend to hard-burn the stone, and the separate points of introduction of fuel and air further minimize the possibility of the combustion taking place above the material bed as is likely to happen with the old type concentric gas and air ports. As a result, the heat loss to the stack and the depreciation of the kiln and stack lining are substantially reduced thus decreasing maintenance costs and increasing the length of time the kiln can be run between shutdowns for relining.

The preheating of the combustion air has been found to be necessary to produce the desired uniform calcining action. The preferred temperature range of the preheated air is between 400°–600° F. although it is expected that acceptable results could be obtained with somewhat higher or lower temperatures.

The increased production obtainable from a kiln by using the present invention is realized primarily due to the permissible increase in the depth of the bed of particulate material passing through the calcining section. Bed depth in the range of 18–20 inches can be maintained using the present method and apparatus without prejudicing the uniformity of the calcining treatment. As a result, the tonnage output of a kiln can be increased from 30 to 50 percent, and even higher production increases have been noted at some installations.

From an economic standpoint, the invention despite its apparent simplicity thus provides rather striking improvements both in the output capabilities of a particular kiln as well as the cost per ton of calcining the material. As a further and equally important benefit, the product produced by the present method and apparatus is superior in uniformity to that produced by the kiln without the present improvement. The improved ability to control the calcining conditions and specifically the minimizing of hard-burned lime is an important advantage of the invention.

Figure 8:
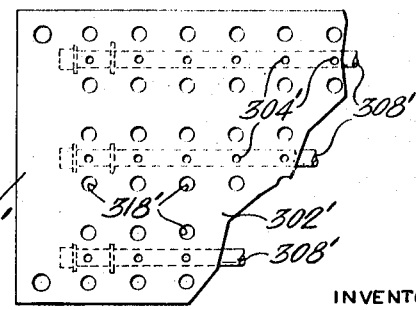
FIG. 8 is a partial plan view of a modified form of burner pad assembly.

In FIG. 8, a modified form of burner pad 300' is illustrated which differs from the preferred pad 300 primarily in the arrangement of the fuel and air inlet ports. In the pad 300', the bedplate 302' is provided with spaced rows of fuel inlet ports 304' which are connected with the underlying pipes 308' as in the preferred embodiment. The fuel ports 304' are, however, somewhat more closely spaced, and tee air inlet ports 318' are arranged in spaced rows on each side of each row of fuel ports. Accordingly, in the modified embodiment there is a pair of air inlet ports for each fuel inlet port, the fuel inlet port being disposed between and equidistant from each adjacent air inlet port.

In the preferred embodiment, each fuel inlet port is also spaced equidistant from a plurality of air inlet ports although the number and arrangements of the ports is different. A variety of arrangements of the fuel and air inlet ports is accordingly possible to permit the separate introduction of fuel and air into the bed of material as described above. Accordingly, the number of the fuel and air inlet ports, and the shape and size of the ports may be varied within the concept of the invention.

The term "particulate material" for purposes of the present invention denotes discrete pieces of solid mineral material which are not fluidized by the introduction or combustion of the air and fuel within the material bed, or by the agitation or vibration of the bed. If the particle size were so small as to fluidize under the influence of the gas and air introduction or combustion, the efficiency of the present method would be adversely affected since the material would be difficult to control and the dust which would develop especially during the periods of vibration would result in serious heat and material losses. Some dust is inevitably formed during the calcining of the discrete particles although it does not seriously affect the efficiency of the process. The size of the discrete pieces of material should be chosen accordingly, and for the calcining of limestone a preferred size of the particles is from ⅜ to 1½ inches screen size.

While the illustrated method and apparatus have shown a kiln wherein the material is advanced through a calcining zone by vibration perpendicular to the path of movement of the material, it will be obvious that the direction of vibration is not important to the invention and that the vibration or agitation may effectively be applied in any direction such as in the path of material movement. Alternately, an oscillatory movement of the bed could be employed.

Although in the calcining of limestone the preferred gaseous fuel is natural gas, other gaseous fuels could be satisfactorily employed and other fuels such as oil which would convert into the gaseous form upon entry into the material bed would also be suitable.

As evidenced by the differences between the calcining zones of the above-referenced U.S. Pat. Nos. 3,250,520 and 3,022,988, the shape and arrangement of the calcining zone is not critical to the invention provided that support means is included for the support of a material bed of substantial depth into which the gaseous fuel and preheated air may be separately introduced at separate spaced locations.

We claim:

1. The method of calcining particulate mineral material comprising the steps of disposing the material on support means in a calcining zone to form a nonfluidized bed of substantial depth, introducing a fluid fuel into said bed of material through said support means at a plurality of spaced locations, introducing preheated air into said bed of materials through said support means at a plurality of spaced locations separate from and spaced from said fuel introduction locations, and vibrating said material support means to advance the material along a predetermined path through said calcining zone, said preheated air and fluid fuel penetrating and uniformly burning throughout the particulate material bed to provide a uniform controlled calcining of the material.

2. The method as claimed in claim 1 including the step of preheating the particulate material prior to introduction of the material into said calcining zone.

3. The method as claimed in claim 1 wherein said material support means is intermittently vibrated to advance the material through said calcining zone.

4. The method as claimed in claim 1 wherein said fuel is introduced into said material bed at locations spaced equidistant a plurality of air introduction locations.

5. The method as claimed in claim 1 wherein said fuel comprises a gaseous fuel.

6. A calcining kiln comprising a calcining zone, means including at least one burner pad assembly adapted to support a nonfluidized bed of particulate material within said calcining zone, means for vibrating said material bed support means to advance said material along a substantially predetermined path through said calcining zone, means for introducing a fluid fuel and preheated air into the nonfluidized bed of material for combustion therewith, said latter means comprising a plurality of fuel inlet ports in said burner pad assembly connected with a source of fuel under pressure, and a plurality of air inlet ports in said burner pad assembly separate and spaced from said fuel inlet ports and connected with a source of preheated air under pressure.

7. the invention as claimed in claim 6 wherein each said fuel inlet port is spaced equidistant a plurality of said air inlet ports.

8. In a calcining kiln having a calcining zone including means adapted to support a nonfluidized bed of particulate material, means for vibrating the bed support means to advance the material along a substantially predetermined path through said calcining zone, and means for introducing a fluid fuel and preheated air into the bed for combustion therewithin, the improvement comprising means for introducing the fluid fuel and preheated air into said material bed at a plurality of separate spaced locations whereby the air and fuel penetrate and uniformly burn throughout the particulate material bed to provide a uniform controlled calcining of the material, said means for introducing the fuel and air into said material bed comprising at least one burner pad assembly on which said bed of particulate material is supported, said burner pad assembly comprising a flat bedplate, a plurality of spaced fuel inlet ports in said bedplate, means connecting said fuel inlet ports with a source of fluid fuel under pressure, a plurality of air inlet ports in said bedplate, said air inlet ports being separate and spaced from said fuel inlet ports, and means connecting said air inlet ports with a source of preheated air under pressure.

9. The invention as claimed in claim 8 wherein each said fuel inlet port is spaced equidistant a plurality of said air inlet ports.

10. A calcining kiln comprising a calcining zone, means adapted to support a nonfluidized bed of particulate material within said calcining zone, means for preheating the particulate material prior to the introduction of the material into said calcining zone, means for intermittently vibrating said material bed support means to advance said material along a predetermined path through said calcining zone, said material bed support means comprising a plurality of burner pad assemblies, each said burner pad assembly comprising a flat bedplate, and means for introducing a gaseous fuel and preheated air into the nonfluidized bed of material for combustion therewithin, said latter means comprising a plurality of spaced fuel inlet ports in each said burner pad bedplate, means connecting said fuel inlet ports with a source of gaseous fuel under pressure, a plurality of air inlet ports in each said burner pad bedplate, said air inlet ports being separate and spaced from said fuel inlet ports, and means connecting said air inlet ports with a source of preheated air under pressure.

11. The invention as claimed in claim 10 wherein each said fuel inlet port is spaced equidistant a plurality of said air inlet ports.

* * * * *

UNITED STATES PATENT OFFICE
CERTIFICATE OF CORRECTION

Patent No. 3,643,932    Dated February 22, 1972

Inventor(s) Bolton L. Corson and Budd R. Royer

It is certified that error appears in the above-identified patent and that said Letters Patent are hereby corrected as shown below:

Column 2, line 10, after "material" (second occurrence) insert --bed--.

Column 5, line 12, change "tee" to --the--.

Column 6, line 22, change "therewith" to --therewithin--

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents